(12) United States Patent
Lester et al.

(10) Patent No.: US 7,042,528 B2
(45) Date of Patent: May 9, 2006

(54) DISPLAY RETRACT MECHANISM

(75) Inventors: Gerald E. Lester, Costa Mesa, CA (US); Bradley Foreman, Mission Viejo, CA (US); Mauricio J. Mirand, Long Beach, CA (US); Doris McQuaid, Laguna Beach, CA (US)

(73) Assignee: Thales Avionics, Inc., Edison, NJ (US)

( * ) Notice: Subject to any disclaimer, the term of this patent is extended or adjusted under 35 U.S.C. 154(b) by 262 days.

(21) Appl. No.: 10/273,237

(22) Filed: Oct. 17, 2002

(65) Prior Publication Data

US 2004/0075639 A1 Apr. 22, 2004

(51) Int. Cl.
*H04N 5/645* (2006.01)
*H04N 5/64* (2006.01)

(52) U.S. Cl. .............. 348/825; 348/836; 348/837

(58) Field of Classification Search .......... 348/825, 348/836, 837; 248/370, 421, 323, 631, 584, 248/585, 564, 919; H04N 5/645, 5/64
See application file for complete search history.

(56) References Cited

U.S. PATENT DOCUMENTS

| 5,076,524 | A | | 12/1991 | Reh et al. |
|---|---|---|---|---|
| 5,181,771 | A | * | 1/1993 | Robak et al. ............... 312/7.2 |
| 5,222,780 | A | | 6/1993 | Reh et al. |
| 5,257,438 | A | | 11/1993 | Faas et al. |
| 5,467,106 | A | | 11/1995 | Salomon |
| 5,583,735 | A | | 12/1996 | Pease et al. |
| 5,743,487 | A | | 4/1998 | Rice |
| 5,847,685 | A | | 12/1998 | Otsuki |
| 6,012,785 | A | | 1/2000 | Kawasaki |
| 6,097,595 | A | | 8/2000 | Cipolla |
| 6,191,886 | B1 | * | 2/2001 | Sinkoff ....................... 359/443 |
| 6,256,078 | B1 | | 7/2001 | Ogata |
| 6,352,226 | B1 | | 3/2002 | Gordon |
| 6,384,875 | B1 | * | 5/2002 | Bertagna .................... 348/825 |
| 6,445,573 | B1 | * | 9/2002 | Portman et al. ............. 361/681 |
| 6,484,993 | B1 | * | 11/2002 | Huffman .................... 248/323 |
| 6,585,214 | B1 | * | 7/2003 | Dittmer ...................... 248/370 |
| 6,633,286 | B1 | * | 10/2003 | Do et al. .................... 345/205 |
| 2002/0163776 | A1 | * | 11/2002 | Thompson et al. ......... 361/681 |

* cited by examiner

*Primary Examiner*—John Miller
*Assistant Examiner*—Trang U. Tran
(74) *Attorney, Agent, or Firm*—Gardner Carton & Douglas LLP

(57) ABSTRACT

A display retract mechanism for moving a display between a retracted position and a deployed position is disclosed and explained. The display retract mechanism is useful, for example, in mounting a liquid crystal display within the cabin of a passenger vehicle, such as an aircraft or bus. A geared chain drive supplies torque necessary for rotating a pivot shaft on which the display is attached. The display is biased toward a retracted position by a gas spring with a substantially linear force curve between the retracted position and the deployed position. Also disclosed are an infrared sensor for detecting when the display is in the deployed position, a solenoid latch for holding the display in the retracted position, and an electromechanical clutch for maintaining the display in a particular position.

50 Claims, 10 Drawing Sheets

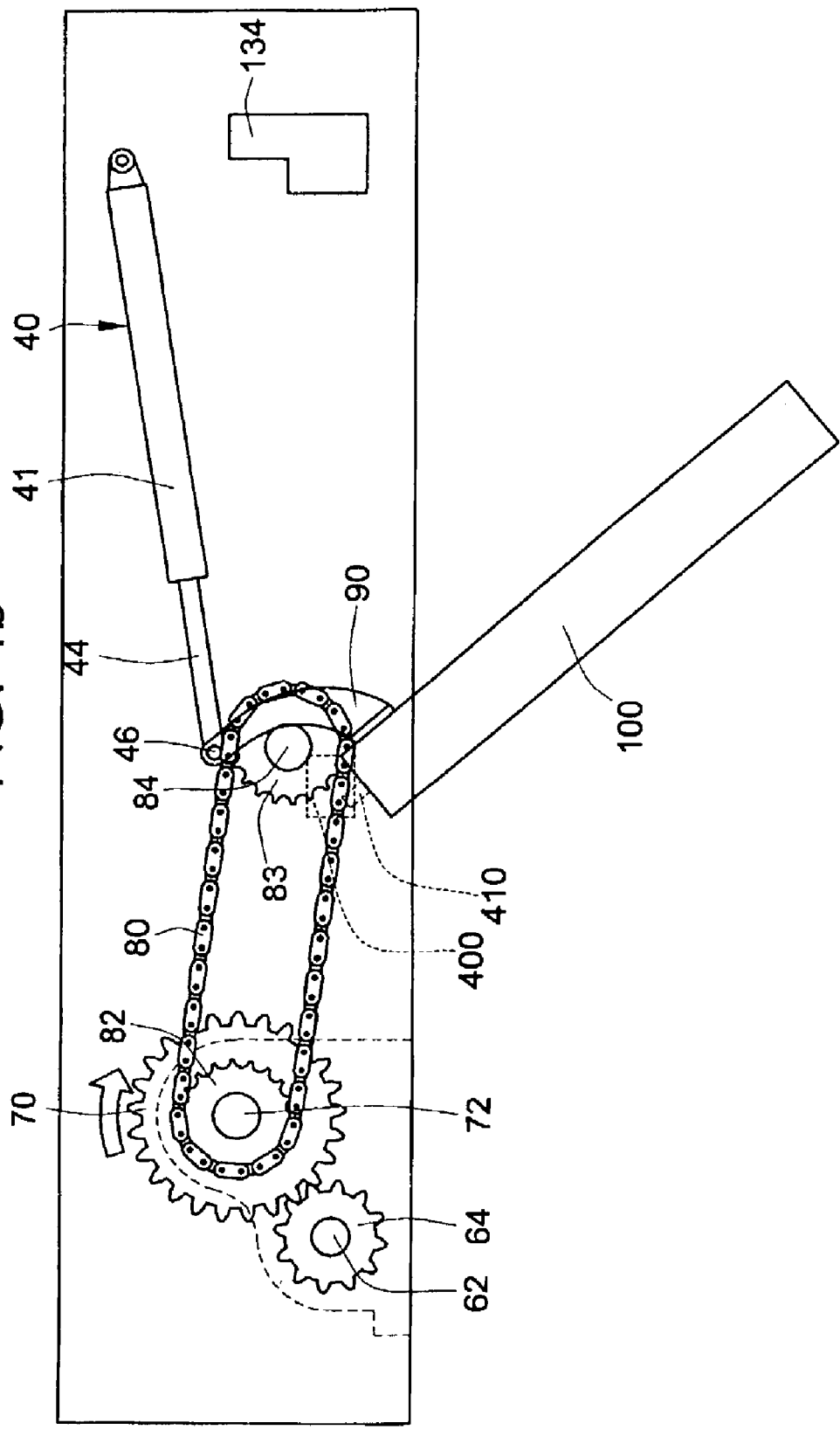

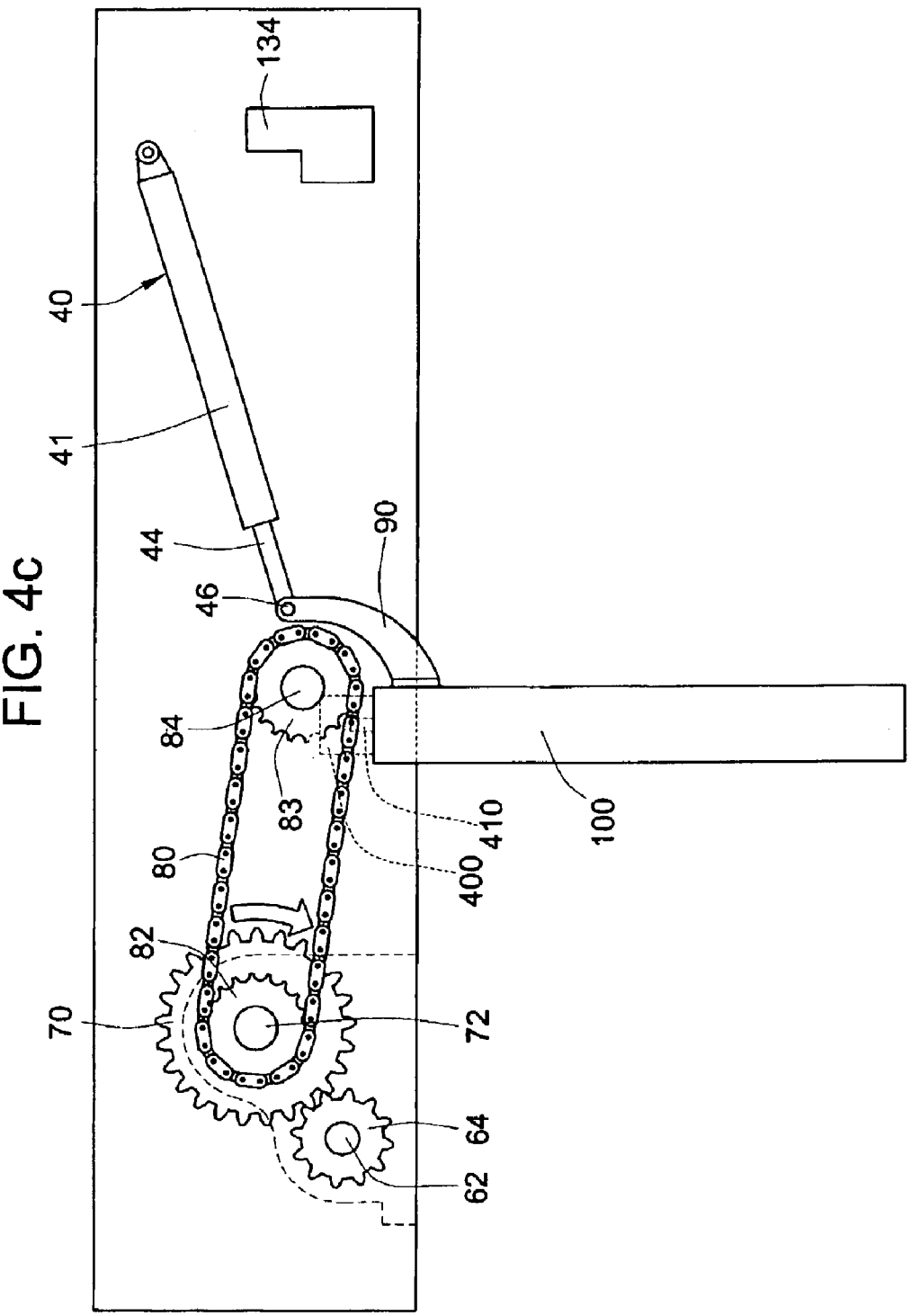

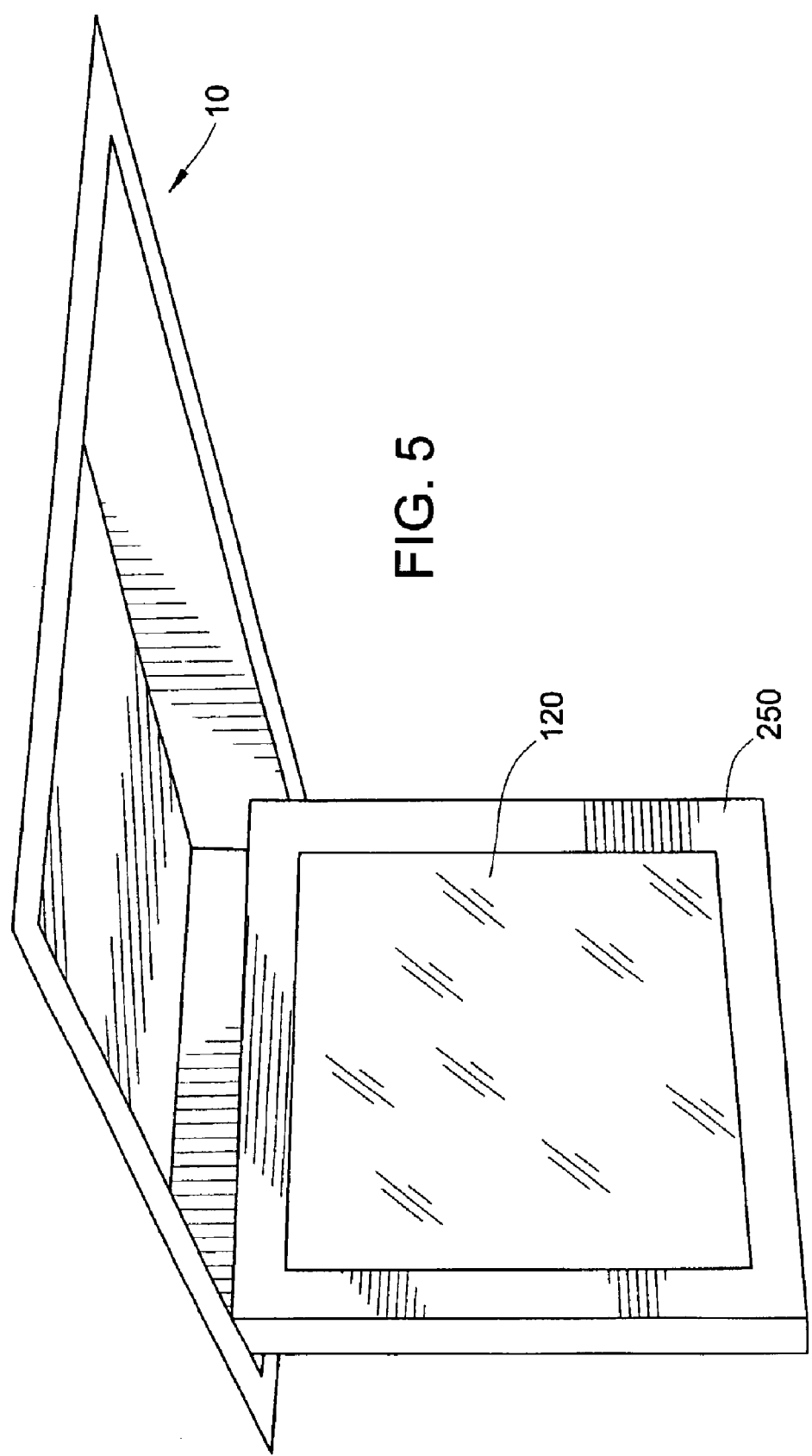

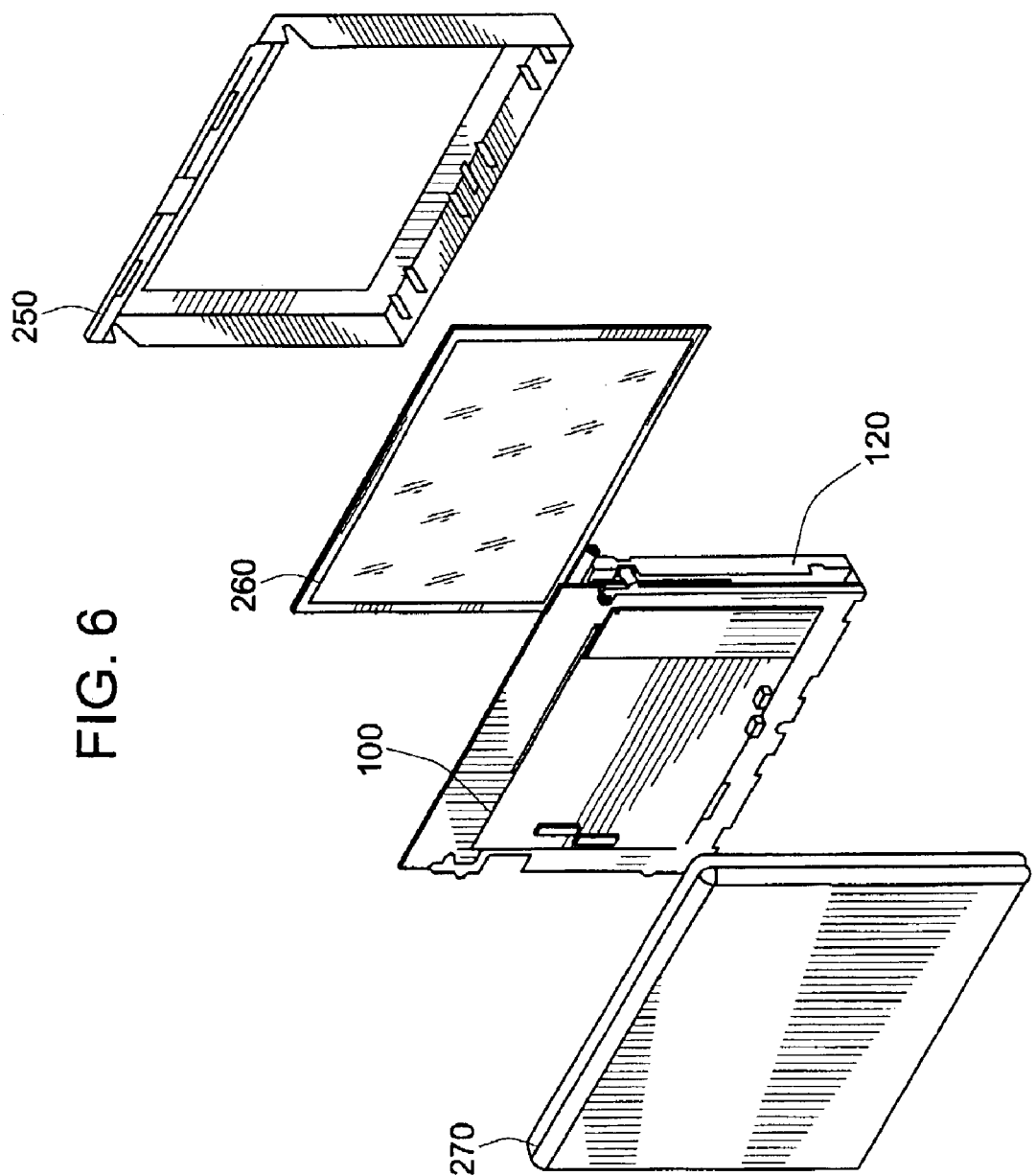

DISPLAY RETRACT MECHANISM

FIELD OF THE INVENTION

The invention pertains to mechanical devices for use in moving an overhead display. Specifically, the invention is a mechanism for deploying and retracting an overhead display.

BACKGROUND OF THE INVENTION

In a passenger vehicle it may be desirable for a display, such as a video display, to be hidden when not in use. A mechanical device is necessary for deploying and retracting the display. In most environments, the mechanical device may also be subject to additional constraints such as size, weight, and power constraints. In some environments there may be additional constraints. For example, in an aircraft environment a mechanical device used for deploying and retracting an overhead display must automatically retract in the event of power loss to the cabin, or in the event that the head of a passenger strikes the display.

Traditional methods for deploying and retracting displays in passenger vehicles include the use of linkage arms extending from a motor to a monitor to rotate the monitor to a pre-set viewing position. A slip clutch between the monitor and the motor allows for the display to retract when struck from a certain direction. A mechanical spring stores the energy or automatic retract of the monitor in an emergency situation resulting in the loss of power.

Displays have been deployed and retracted by mechanisms linking the motor to the monitor by gears. The gear and motor linkage approach wears at the pivot points and the monitor vibrates during transportation making viewing difficult. Vibrations in the display during transport may be reduced with tighter tolerance gears, but tighter tolerance gears would be ineffective from both weight and cost perspectives, and gear tolerance will be lost with time and use.

Vibrations in the display have also been reduced by using a brake and by driving a motor in reverse. The brake damps the vibrations transmitted to a display from a motor while the display is deploying, and maintains the display in a deployed position. The display is moved from the deployed to a retracted position by first releasing the brake. Vibrations are damped while the display is retracting by driving the motor in reverse. The energy necessary to move the display from the deployed to the retracted position is generally stored in a spring. Since driving the motor in reverse increases resistance to the movement of the display, a larger spring is required when this technique is used for damping vibrations. Often, larger springs create noisy whines when they are wound and unwound in this way.

In some passenger vehicles, the electromagnetic interference ("EMI") generated by a display may also be an issue. Power and video distribution systems use single stranded wires or combinations of flex and single stranded wires to distribute power. The power is distributed between the video board in the monitor assembly and the main chassis. The length of the wires, and the high frequencies of the video signals being transmitted through them, together act like an antenna. In general, any mechanical device designed for deploying and retracting an overhead display must attempt to mitigate the effects of EMI on the video signal transmitted to the display.

BRIEF SUMMARY OF THE INVENTION

The invention provides a display retract mechanism for moving a display from a deployed position to a retracted position. The display retract mechanism includes a frame adapted for holding a display, a pivot shaft, a lever arm fixed to the pivot shaft, a gas spring, and a drive mechanism. The pivot shaft is attached to the frame along a pivot axis, and the pivot shaft rotates around the pivot axis from the retracted position to the deployed position and back. The frame, which is adapted for holding the display, is attached to the pivot shaft along the pivot axis so that as the pivot shaft rotates around the pivot axis the frame, which holds the display, moves from the retracted position to the deployed position. The gas spring is hingedly connected to the lever arm, which is in turn fixed to the pivot shaft. The arrangement allows for the display to be retracted when power to the drive mechanism is off.

The present invention also provides a facility for detecting when the monitor is in a retracted position. In an embodiment, there is provided an infrared transmitter for supplying an infrared signal. As will be recognized by those of skill in the art, other types of transducers, including ultrasonic, electro-optic, or electromechanical are also possible. The detector of the present invention could be any one of a variety of such transducers. The infrared signal is received by an infrared sensor, which produces a status signal when the infrared signal is received. When the display is in the retracted position, a pin mounted on the frame blocks the infrared signal, preventing the infrared signal from reaching the infrared sensor. The status signal produced by the infrared signal is supplied to a printed circuit board, where it is useful for producing a control signal. The printed circuit board is optionally connected with power and video connectors. The EMI with video signals sent between the printed circuit board and the display is advantageously reduced through the use of a cross-hatched slip past cable.

In an embodiment of the present invention, the drive mechanism includes a motor for driving a motor shaft; a drive shaft; a mechanical coupler for joining the motor shaft to the drive shaft; a first gear on the drive shaft; a second gear on a gear shaft, the first gear in mechanical contact with the second gear; a first sprocket attached to the gear shaft; a second sprocket attached to the pivot shaft; a chain mounted on both the first sprocket and the second sprocket, whereby the torque from the gear shaft is transmitted to the pivot shaft; a motor controller card for producing a motor drive signal in response to the control signal from the printed circuit board; and a power supply for supplying a power to the display retract mechanism. Optionally, an electromechanical clutch mechanism may be provided to the drive mechanism for selectively engaging and disengaging the drive mechanism. In addition, a solenoid latch optionally may be provided to the display retract mechanism for locking the frame into the retracted position. The gear ratio of the first gear to the second gear is about 200 to 1. The relatively low gear ratio is an advantage of the present invention.

The display retract mechanism may optionally provide a housing, to which the pivot shaft may be mounted. The housing is adaptable for receiving the frame when the display is in the retracted position. The housing is not necessary to the present invention; rather, it is a convenience allowing for simpler installation and de-installation of the device, providing a single mechanical structure to which some parts of the device may be attached. It will be understood by those of skill in the art that the housing is not necessary to the function of the present invention.

In a preferred embodiment of the present invention, the frame and the housing are fabricated from a material that is mechanically strong, heat resistant, and burns with low toxicity. The frame and the housing may be fabricated from a material selected from the group consisting of polyetherimide or polyphenylsulfone. In addition, the housing may be coated with a copper epoxy resin, which includes a mixture of copper micro-spheres. EMI produced by the display retract mechanism is advantageously reduced through the use of the copper epoxy resin.

In addition, the present invention provides a method for moving a display from a deployed position to a retracted position. The method includes the following steps: holding the display in a frame; rotating a pivot shaft around a pivot axis, the frame attached to the pivot shaft along the pivot axis; fixing a lever arm to the pivot shaft, the lever arm compressing a gas spring as the pivot shaft is rotated around the pivot axis from the retracted position to the deployed position; and supplying torque to the pivot shaft for rotating the pivot shaft from the retracted to the deployed position with the drive mechanism. The method may optionally include the further steps of generating an infrared signal; receiving the infrared signal in order to produce a status signal; blocking the infrared signal with a pin in order to prevent the receiving of the infrared signal; and processing the status signal in order to produce a controlled signal. In an optional final step, the pivot shaft may be attached to a housing, the housing adapted for receiving the frame when the display is the retracted position.

The power and video distribution system of the present invention may combine all power and video cables to the LCD in a cross-hatched, slip-past, flexible cable. The cable is chosen for its ability to withstand multiple flex cycles, and for its ability to shield from EMI.

The display retract mechanism also uses a gas spring to retract the monitor. The gas spring provides a near linear force curve for the range of actuation, requiring less power from the drive mechanism, and allowing for smoother operation of the display retract mechanism as a whole. The combination of the clutch, motor, and gas spring of the present invention provides a quieter display retract mechanism than has been conventionally available.

BRIEF DESCRIPTION OF THE DRAWINGS

The foregoing and other objects, advantages, and features of the present invention will be apparent from the following detailed description and the accompanying drawings, in which:

FIG. 4*b* is a side view of a display retract mechanism with the display in a partially deployed position in accordance with an embodiment of the present invention;

FIG. 4*c* is a side view of a display retract mechanism with the display in a deployed position in accordance with an embodiment of the present invention;

FIG. 5 is a perspective view of a display in a deployed position in accordance with an embodiment of the present invention;

FIG. 6 is an exploded view of a frame for a display for use with a display retract mechanism in accordance with an embodiment of the present invention;

DETAILED DESCRIPTION OF THE INVENTION

In a passenger vehicle, such as an aircraft, it is desirable for overhead displays to be mounted in close proximity to a passenger. The underside of an overhead bag bin is preferable to the ceiling of an aisle because many displays are best viewed at close proximity, from a viewing angle perpendicular to the plane of the display. However, a display mounted on the underside of an overhead bag bin may create an obstruction to passengers, for example, by hindering a passenger from entrance to or exit from a seat. Hence, it is desirable for a device to be provided that serves to stow a display in a retracted position when not in use. The present invention provides a display retraction mechanism for rotating an overhead display, such as might be mounted underneath a bag bin on an aircraft, between a retracted and a deployed position.

The advantages of the present invention are obtained in part through the use of a chain drive with a low gearing ratio, a gas spring for biasing the display towards the retracted position, an infrared transmit and receive sensor, an electromagnetic clutch, and a housing and cables designed to minimize EMI.

Figure 1:
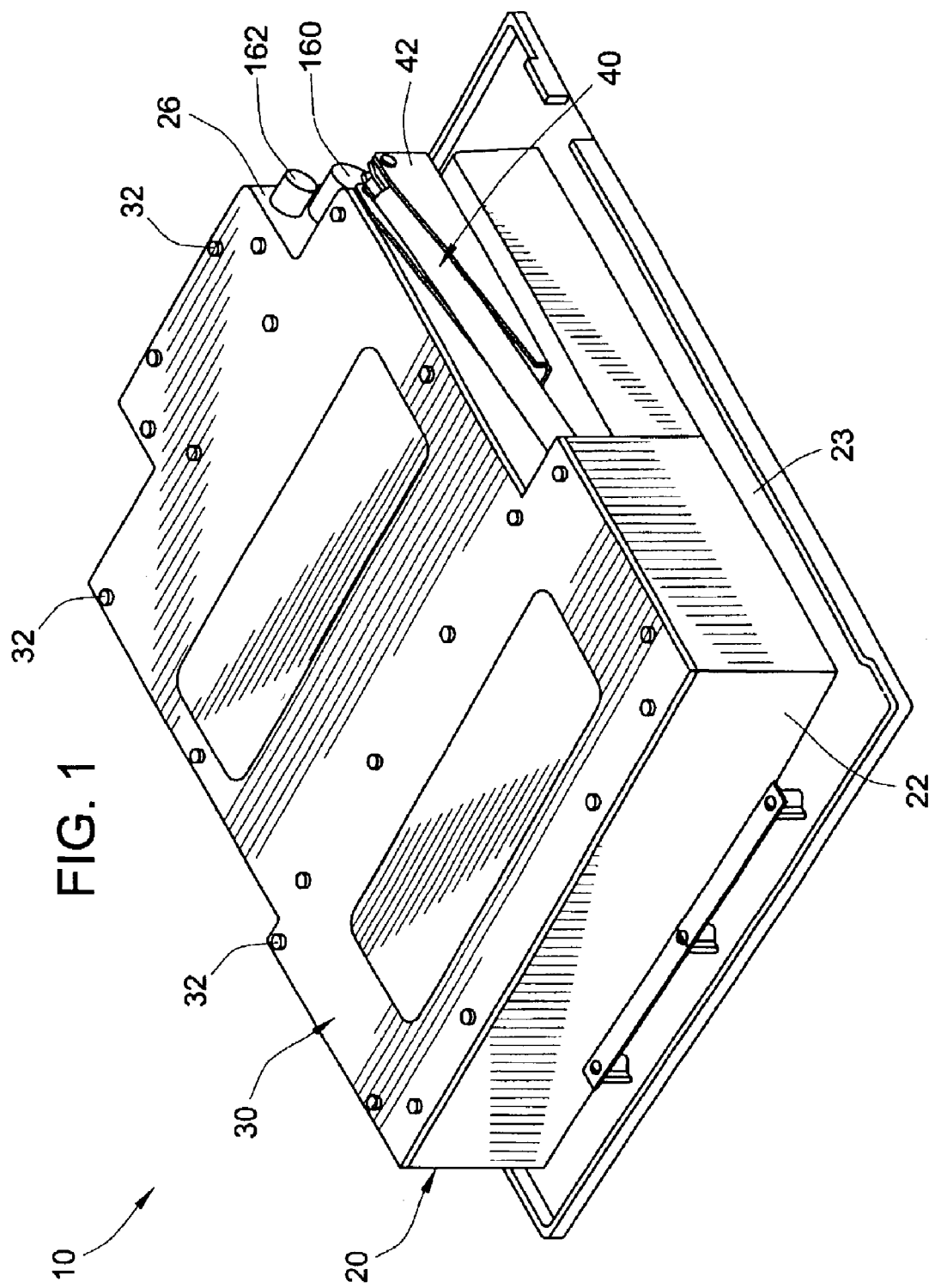
FIG. 1 is a perspective view of a housing for a display retract mechanism in accordance with an embodiment of the present invention.

Although it is not necessary to the method or system of the present invention, it is desirable for a housing 10 to be provided to the present invention. An embodiment of a housing for a display retract mechanism is shown in FIG. 1. The housing 10 is comprised of a base 20 and a back cover plate 30. The back cover plate 30 is secured to the base 20 by fasteners 32. The base 20 comprises a base front 22, a base plate 23, and a base back 26 (the base bay 24 is hidden beneath the back cover plate 30 in FIG. 1). A gas spring 40 on a gas spring mount 42 is shown. Standard video signal connectors (as are recognized by those of skill in the art), including a power connector 160 and a video connector 162 are also shown in FIG. 1.

Figure 2:
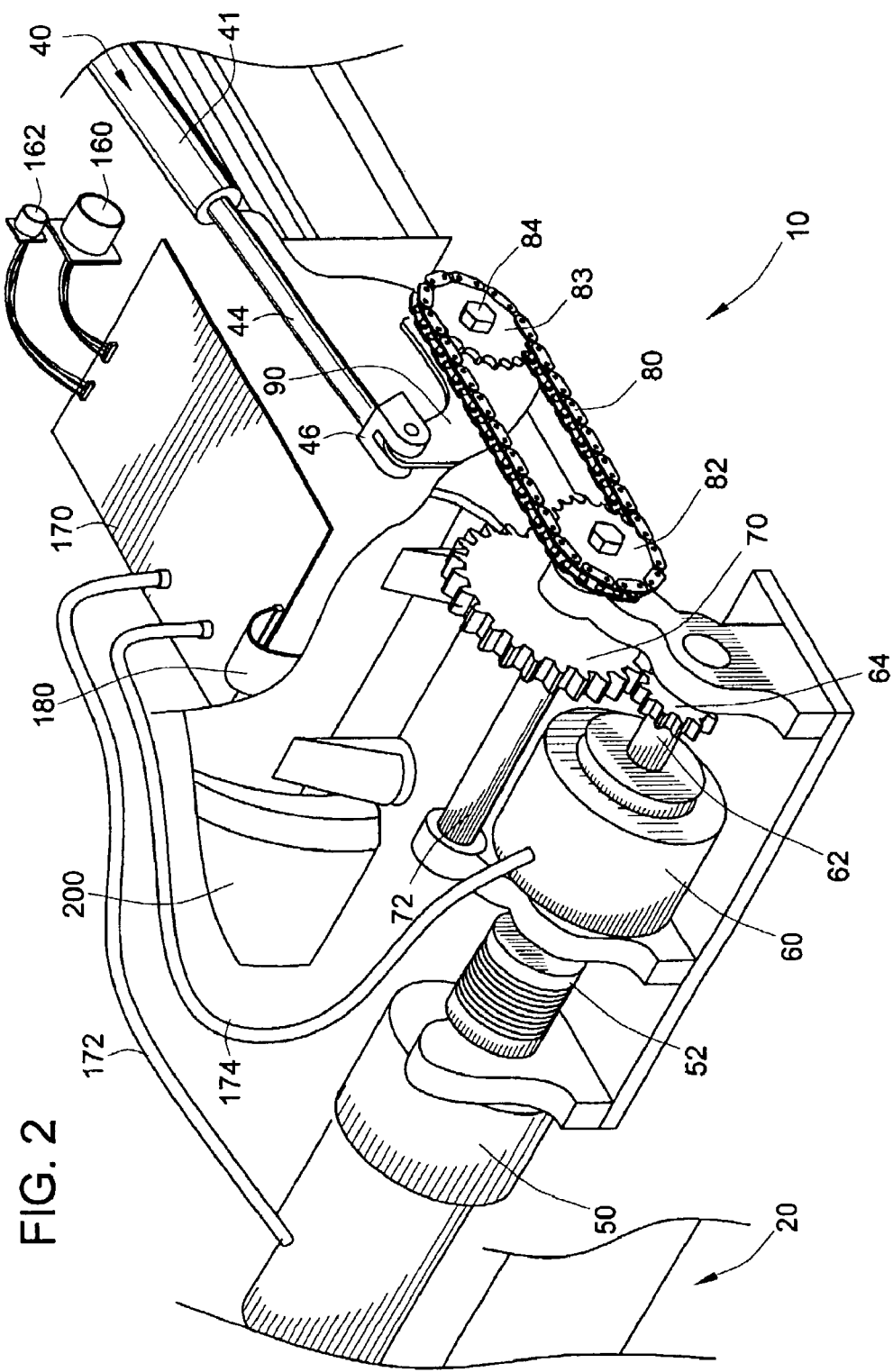
FIG. 2 is a perspective view of the drive mechanism in accordance with an embodiment of the present invention.

The primary source of energy for rotating the display from a retracted position to a deployed position is provided by the drive mechanism shown, in an embodiment, in FIG. 2. The gas spring 40 comprises a gas spring barrel 41 and a gas spring rod 44. The end of the gas spring rod 44 is hingedly connected to a lever arm 90 by its forked end 46. The lever arm 90, which serves to transmit force from the gas spring 40 to the pivot shaft 84, is fixed to the pivot shaft 84 by a suitable fixing means, such as a screw, bolt, or epoxy. Other fixing means, such as a weld, are suitable also. As will be understood by those of ordinary skill in the art, the lever arm 90 need not have the specific shape shown in FIG. 2. Other mechanical means, for example, a lever arm of different shape, a linkage arm, or a hook, may be used as a lever arm 90 for connecting the gas spring to the pivot shaft, thereby transmitting the bias force from the gas spring to the pivot shaft. The pivot shield 200 and the base 20 are cut-away in FIG. 2 so that the interior of the housing 10 is visible, including the printed circuit board 170, the cables 172 and 174, and the power connector 160 and video connector 162.

The energy required to oppose the force of the gas spring is generated by the motor 50 which receives power and control signals from the printed circuit board 170 through a cable 172. The motor shaft (hidden behind the mechanical coupler 52 in FIG. 2) for the motor 50 is connected to drive shaft 62 through the mechanical coupler 52. An electromechanical clutch 60 is provided with power and control signals from the printed circuit board 170 through a cable 174. The drive shaft 62 is connected to a first gear 64, and the teeth of the first gear mesh with the teeth of a second gear 70 on a gear shaft 72. Also mounted on the gear shaft 72 is a first sprocket 82. The first sprocket 82 has teeth provided for holding a chain 80. The chain 80 transmits rotational momentum from the gear shaft 72 to the pivot shaft 84, on which a second sprocket 83 is mounted, also having teeth provided for holding the chain 80.

Also shown in FIG. 2 is the slip past cable 180 by which the printed circuit board 182 is connected to the display (not shown in FIG. 2). Power and data are supplied to the printed circuit board 170 through a power connector 160 and a video connector 162.

Figure 3:
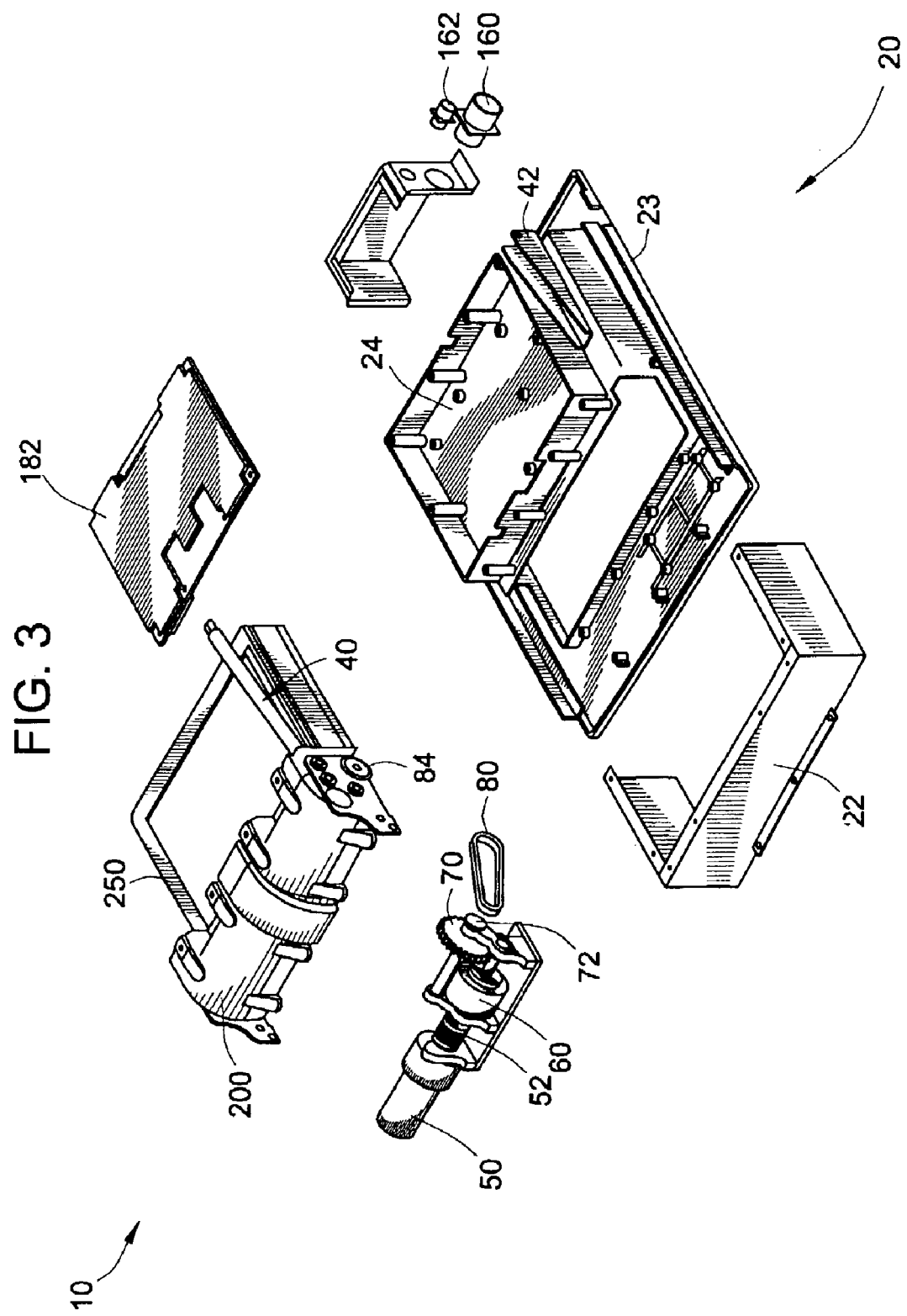
FIG. 3 is an exploded view of a display retract mechanism in accordance with an embodiment of the present invention.

The various components of the display retract mechanism, according to an embodiment of the present invention, are shown disassembled in FIG. 3. The base 20, which is part of the housing 10, comprises four parts, including a base front 22, a base plate 23, a base bay 24, and a base back 26. All or some of these parts may be coated with a copper epoxy resin, which includes a mixture of copper microspheres. The copper epoxy resin provides additional EMI shielding by providing a strongly conducting layer between the electronics within the housing 10 and the rest of the passenger vehicle in which the present invention is mounted.

The base front 22 provides shielding from EMI, as well as a mechanical barrier between the drive mechanism and another device that might exist in a passenger vehicle in which the present invention is mounted. The base front 22 is fixed to the base plate 23 with a suitable mechanical device for attachment, such as a screw, bolt, or epoxy.

The base bay 24 is part of the same physical material as the base plate 23, and constitutes a recess shielded from EMI in which the printed circuit board 182 may be mounted and to which the back cover plate 30 may be partially fixed. In the embodiment of the invention shown in FIG. 3, the gas spring mount 42 is attached beside the base bay 24, fixed directly to the base plate 23 with a suitable mechanical device for attachment, such as a screw, bolt, or epoxy. The base back 26 provides a mount for the power connector 160 and video connector 162, and is also fixed to the base plate 23 with a screw, bolt, or epoxy. The base back 26 also provides part of the support for the back cover plate 30.

The pivot shield 200 is also fixed to the base plate 23 with a suitable mechanism for fixing, such as a screw, bolt, or epoxy, and serves to provide shielding from EMI and prevents interference from another mechanical device with the drive mechanism. The drive mechanism, including the motor 50, mechanical coupler 52, electromechanical clutch 60, second gear 70, gear shaft 72, and chain 80 are also shown in FIG. 3. Finally, the front cover 250 is shown in the retracted position in FIG. 3.

Figure 4A:
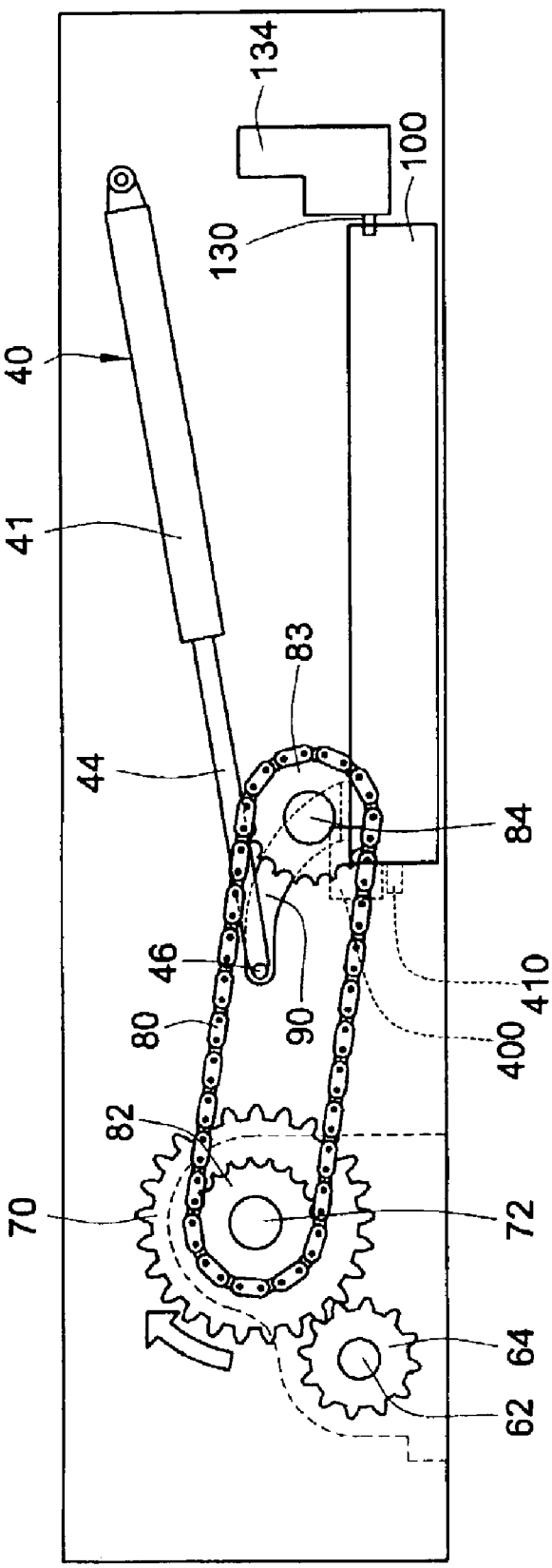
FIG. 4*a* is a side view of a display retract mechanism with the display in a retracted position in accordance with an embodiment of the present invention.

The series of FIGS. 4a–c show an embodiment of how the present invention moves a display from the retracted position (FIG. 4a) to the deployed position (FIG. 4c), with a partially deployed/retracted position in between (FIG. 4b).

On the drive shaft 62 is mounted a first gear 64, with teeth interleaving the teeth of a second gear 70. The first gear 64, is fixed to the drive shaft 62, so that, when the motor 50 (not shown in FIG. 4a) rotates the motor shaft (not shown in FIG. 4a), the angular momentum of the motor shaft is transmitted through the mechanical coupler 52 (not shown in FIG. 4a) to the drive shaft 62, turning the first gear 64 in a counterclockwise direction. As the first gear 64 rotates counterclockwise, the second gear 70 is driven clockwise (in the direction of the arrow shown). The second gear 70 is fixed to the gear shaft 72 so that when the second gear 70 turns, it transmits its angular momentum through the gear shaft 72 to the first sprocket 82, which is also fixed to the gear shaft 72. Around the teeth of the first sprocket 82 is mounted a chain 80. The chain 80 serves to transmit the angular momentum of the clockwise rotating first sprocket 82 to the second sprocket 83, which is mounted on the pivot shaft 84. Hence, the drive mechanism supplies a torque to the pivot shaft that opposes the force generated by the gas spring 40, which is biased toward the retracted position. The choice of motor 50, first gear 64, and second gear 70 must be made considering the strength of the force generated by the gas spring 40, which will vary with embodiments of the present invention. Such a choice could be made readily by one of ordinary skill in the art. In the presently preferred embodiment of the invention, the gearing ratio is about 200:1 (substantially less than the 1000:1 ratios familiar in previous retract mechanisms).

Also shown in FIG. 4a is a solenoid latch 134, with a spike 130 extending toward the frame 100. A recess (not shown) in the frame 100 is provided, into which the spike 130 extends. The spike 130, when extended into the recess, is capable of maintaining the display in the retracted position.

As the pivot shaft 84 is rotated by the drive mechanism in the clockwise direction, the lever arm 90, which is attached to the pivot shaft either directly or indirectly, through the second sprocket 83, is rotated. When the lever arm 90 rotates, the gas spring rod 44 (hingedly connected to the lever arm 90 by its forked end 46) is pushed into the gas spring barrel 42. Hence, the frame 100, which is fixed to the other end of the lever arm 90, moves into a partially deployed position, as shown in FIG. 4b. Note that the main differences between FIG. 4a and FIG. 4b are the shown length of the gas spring rod 44 (shorter in FIG. 4b because the gas spring rod 44 has been pushed into the gas spring barrel 42) and the position of the frame 100. As the same motion continues, the display is moved finally into a fully deployed position, shown in FIG. 4c. Note also that in FIGS. 4b and 4c the latch 134 has withdrawn the spike (130 in FIG. 4a), which is necessary for the display to be deployed.

A plastic pin 410 disposed on the front cover 250 of the frame 100 (shown in FIGS. 4a–c) on an edge of the frame 100 near the pivot axis 708. (The pivot axis 708 is not expressly shown in FIGS. 4a–c, but is shown as a line passing through the center of the pivot shaft 84, which is perpendicular to the plane of the second sprocket 83 in FIG. 7.). The plastic pin 410 blocks an infrared signal, produced by an infrared transmitter, from hitting an infrared photo sensor 400 when the display first reaches the deployed position. The infrared photo sensor 400, not receiving the infrared signal anymore, begins sending a status control signal to the printed circuit board 182 that indicates to the printed circuit board that the display 120 is now in the deployed position. If, during movement, the display 120 meets a threshold level of force, the motor 50 or the clutch 60 will disengage, and the display 120 will return (using the energy stored in the gas spring 40) to the retracted position. During normal operation, the clutch 60 is engaged while the motor 50 is moving the display 120 from the retracted position to the deployed position. The clutch 60 is also engaged while the display 120 is held in the deployed position.

A perspective view of the display 120 as it might appear deployed in a passenger vehicle is shown in FIG. 5. The front cover 250 keeps the display 120 with the frame 100. The under side of the housing 10 is also shown in FIG. 5.

In some environments, for example, in aircraft environments, there are constraints on the manner in which a display retract mechanism may operate. In the United States of America, the Federal Aviation Administration (FAA) requires that all under-bag-bin displays retract automatically in the event of power loss to the cabin during flight. As would be obvious to one of ordinary skill in the art, this requirement is naturally met by the device as disclosed and explained in connection with FIGS. 1–5. When power is no longer supplied to the present invention, the clutch 60 de-energizes and decouples the motor 50 from the gas spring 40, the gas spring 40 then smoothly retracts the display into a retracted position.

The FAA has set an additional requirement, colloquially referred to as the "headstrike" requirement, which demands that a display retract when a force surpassing a given threshold force is applied to a display, for example, when the head of a passenger strikes the display upon entrance to or exit from a seat. The facility of the present invention for handling this requirement is provided by the electromechanical clutch 60 (shown in FIG. 2). In combination with the printed circuit board 182 (to which the electromechanical clutch 60 is connected by a bundled power and data cable 174), the present invention is capable of sensing when the threshold force (as specified by the FAA) has been applied to the display, and the display is moved from the deployed position to the retracted position when that force has been applied. Further details on this state of operation are provided in FIG. 8, and in the description therefor below. The same facility is also effected for retracting the display in the event that it should encounter an obstruction while deploying.

FIG. 6 illustrates the assembly surrounding the display 120 and the frame 100. The display 120 and the frame 100 are situated between a back cover 270 and a front cover 250, with a protective screen 260 fixed between the display 120 and the front cover 250.

Figure 7:
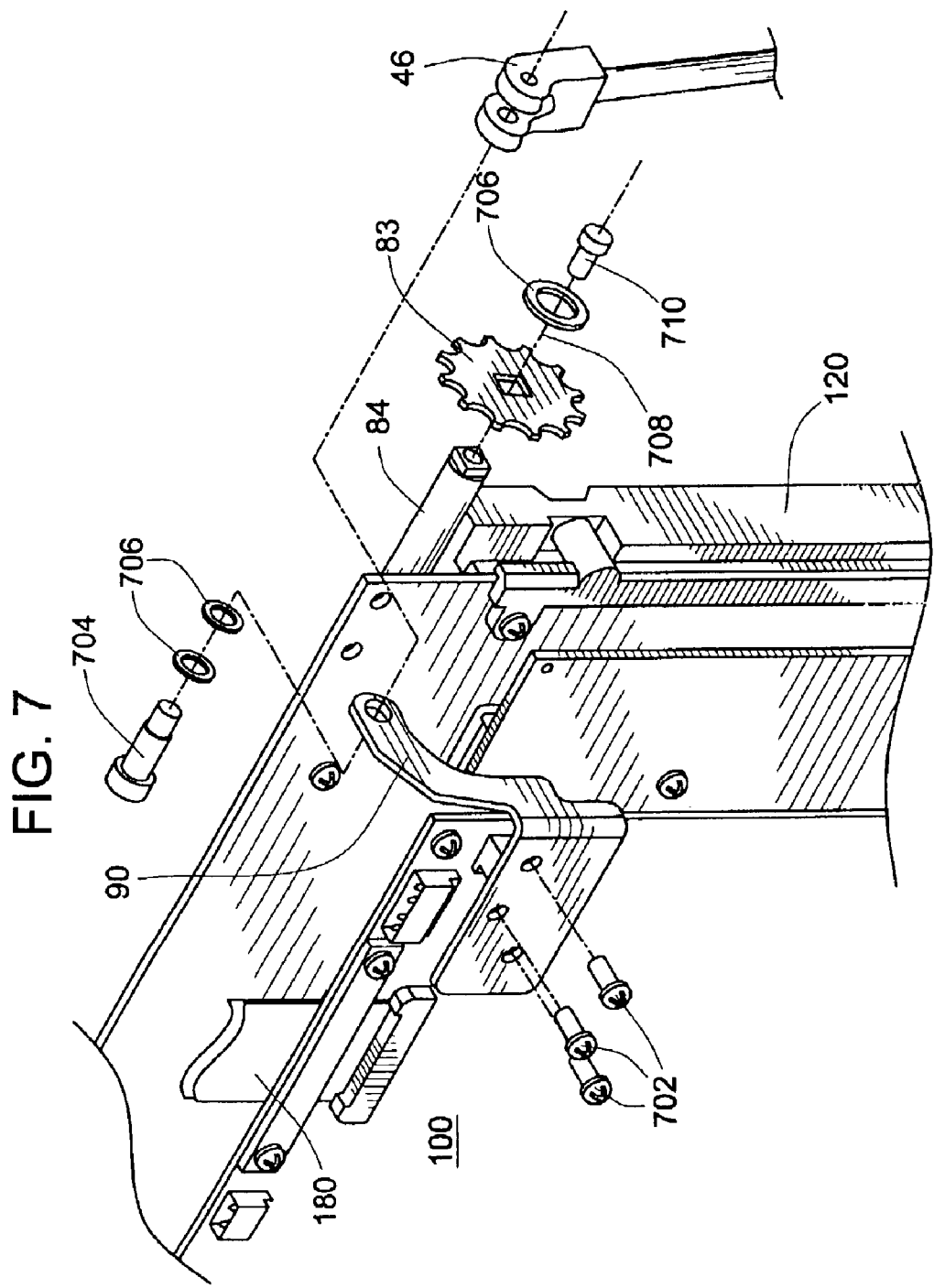
FIG. 7 is a detail of the frame assembly shown in FIG. 6 in accordance with an embodiment of the present invention.

A more detailed view of one corner of the frame 100 is shown in FIG. 7. The frame 100 provides a mechanical support for the cross-hatched cable 180 to interface with the display 120 (not shown in FIG. 7). In addition, the lever arm 90 is fixed with screws 702 to the frame 100. A hinge 704, with several washers 706, hingedly connects the forked end 46 of the gas spring 40 (not shown in FIG. 7) to the lever arm 90. In addition, the frame 100 is physically connected along the pivot axis (shown as the dotted line 708) to the pivot shaft 84. The second sprocket 83, a bolt 710, and a washer 706 are also shown in FIG. 7

A control circuit, including, for example, a microprocessor with memory, is used to keep track of the logical state of the display retract mechanism, and to control its operation. In the present invention, the control circuit is provided as part of the printed circuit board 182. The logical state of the display retract mechanism is defined by keeping track of the current and previous states of the various components of the system, including the motor 50, the electromechanical clutch 60, the solenoid latch 134, the infrared photo sensor 400, and a clock and increment counter in the control circuit of the printed circuit board 182. Using the feedback and control provided by the foregoing, one of ordinary skill in the art may program the control circuitry of the printed circuit board 182 to maintain the display retract mechanism in the following well-defined logical states.

The retracted state 800 corresponds to a logical state in which the display is in the retracted position, with the electromechanical clutch 60 disengaged, and the solenoid latch 134 closed (with the spike 130 providing mechanical support for the weight of the frame 100, as shown in FIG. 41). The power to the motor 50 and clutch 60 may be off, although power may still be provided to the control circuit on the printed circuit board 182.

On receiving a deploy signal, which may be self-generated by the control circuit on the printed circuit board 182, or, alternatively, may be received from an external source in communication with the printed circuit board 170 through the power connector 160 or the video connector 162, the control circuit starts operating the display retract mechanism in the deploying state 810. In the deploying state 810, a clock on the printed circuit board 182 begins counting up, and an increment counter on the printed circuit board 182 is initializes to one. The solenoid latch 134 is released, retracting the spike 130, the electromechanical clutch 60 is engaged, and the motor 50 is powered. In the deploying state 810, the display retract mechanism might appear as shown in FIG. 4b.

One of several error states may occur in sequence after the deploying state 810. Using the clock on the printed circuit board 182, the control circuit keeps track of how long the display has been in the deploying state 810. While deploying, the infrared photo sensor 400 will remain open (as shown by the box labeled 815). If the infrared photo sensor 400 does not close before a preset length of time, then the deploy is timed out 845. An obstruction is preventing the device from deploying in a normal length of time. The clutch 60 allows the motor 50 to rotate even when the display 120 is prevented from deploying because of an obstruction.

When the deploy is timed out 845, the display retract mechanism will automatically begin retracting. The retracting state due to obstruction 840 occurs only when the normal deploying state 810 does not result in a normal deployed state 820, for example, for a reason already discussed, i.e., when the deploy is timed out 845.

When the deploying state 810 moves into the retracting due to obstruction state 840, the increment counter is incremented by one. For example, if the display was in the deploying state 810 for the first time since it was in the retracted state 800, then the increment counter will be incremented from one to two when it is put into the retracting due to obstruction state 840. In addition, the clock is reset.

Three different cases are possible for what logical state will follow the retracting due to obstruction state. In two cases, the display retract mechanism may proceed from the retracting due to obstruction state 840 back to the deploying state 810. In the first case, if the increment counter is less than three, and the deploy had timed out 845 on its last deploy attempt, then the display retract mechanism re-enters the deploying state 810. In the second case, if the override switch 855, which is provided on the exterior of the device, is activated, then the device re-enters the deploying state 810. The override switch 855 allows a human to retake control should the device end up in an ill-defined state. In the third case, the display retract mechanism proceeds directly to the retracted state 800. The third case results when the deploying state 810 has timed out for a second time, so that the increment counter now registers three, which results in a retract time out 860. Having returned to the retracted state 800 from the retracting due to obstruction state 840, the display retract mechanism will not begin deploying again until it receives another deploy signal.

Figure 8:
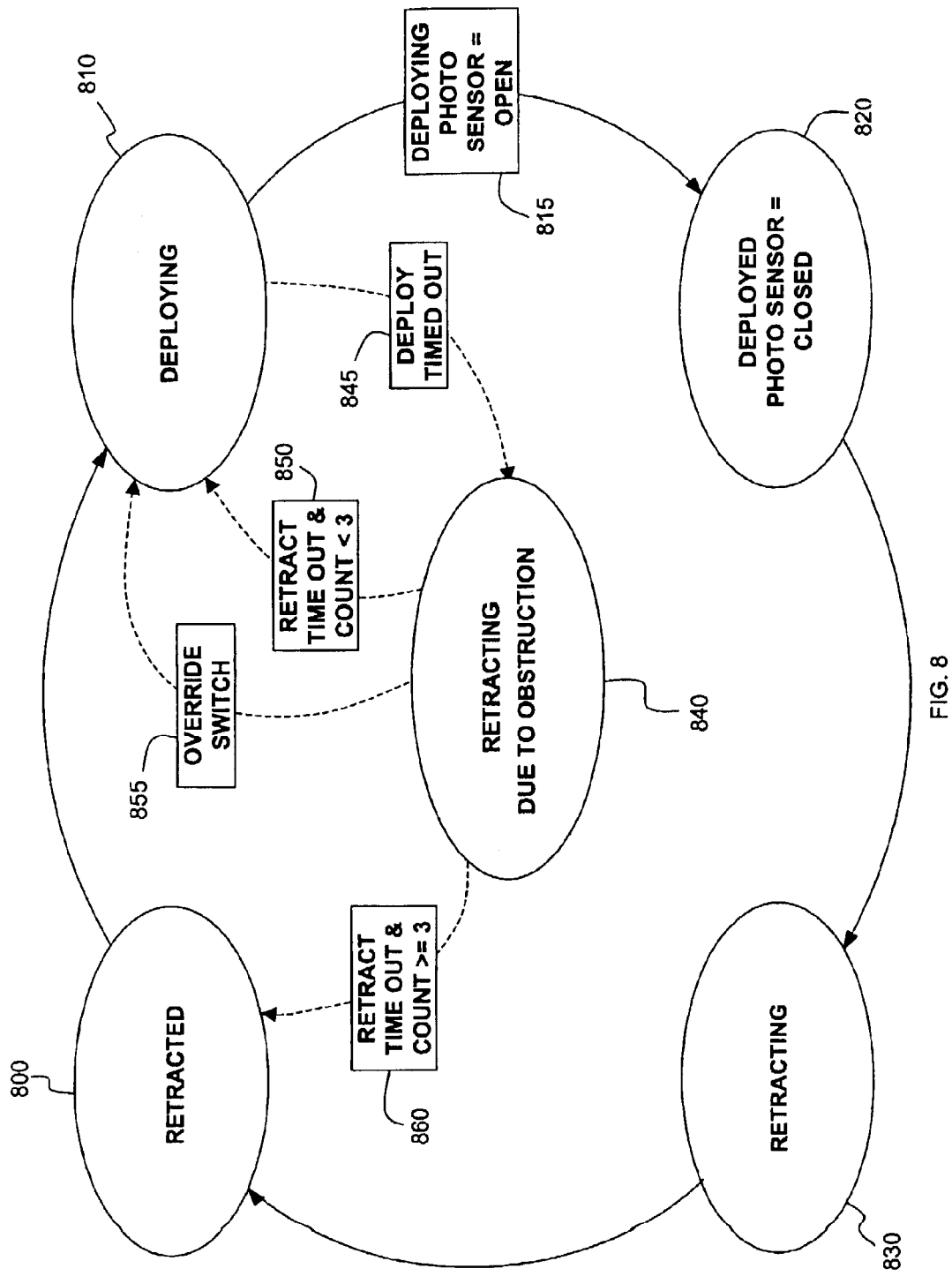
FIG. 8 is a state diagram showing the logical states of a display retract mechanism in accordance with an embodiment of the present invention.

Returning to a description of the normal states of operation, there is shown in FIG. 8 how the display retract mechanism may progress from a deploying state 810 to a deployed (photo sensor=closed) state 220. During the deploying, the photo sensor will remain open 815, allowing a control signal to be sent back to the printed circuit board 182, that indicates that the display retract mechanism must remain in the deploying state 810. After the display 100 has reached the deployed position, a plastic pin 410 (mounted on the front cover 250 in an embodiment of the present invention) blocks an infrared signal from an infrared transmitter from being received by the infrared photo sensor 400, i.e., the photo sensor is closed. Hence, the control signal sent to the printed circuit board 182 now indicates that the display 100 is in the deployed position. The deployed state 820 is characterized by a state in which the motor 50 is stopped, but the clutch 60 remains engaged, holding the display 100 in the deployed position except in the event of power loss, at which time the display 100 will smoothly retract (using the energy stored in the gas spring 40) into the retracted position.

In an embodiment, the printed circuit board 182 receives a retract signal in the same way that it receives a deploy signal. Upon receipt of a retract signal, the clutch 60 is disengaged, and the display 100 smoothly retracts in the retracted position (in substantially the same way that it would were the power to the display retract mechanism turned off. Having returned to the retracted position 800, the device is ready to begin the cycle again with another deploy signal.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A display retract mechanism for moving a display from a deployed position to a retracted position, comprising:
    a frame adapted for holding a display;
    a pivot shaft defining a pivot axis, the pivot shaft rotatable around the pivot axis from the retracted position to the deployed position;
    a lever arm fixed to the pivot shaft;
    a gas spring biased toward the retracted position, the gas spring hingedly connected to the lever arm;
    a drive mechanism for rotating the pivot shaft around the pivot axis from the retracted to the deployed position, and
    wherein the gas spring substantially freely moves the pivot shaft from the deployed position toward the retracted position when the drive mechanism releases the pivot shaft.

2. The display retract mechanism of claim 1, further comprising:
    a detector for determining when the frame is in the retracted position.

3. The display retract mechanism of claim 2, wherein a cross-hatched slip past cable connects the display to a printed circuit board.

4. The display retract mechanism of claim 3, wherein the printed circuit board is connected to a power connector.

5. The display retract mechanism of claim 3, wherein the printed circuit board is connected to a video connector.

6. The display retract mechanism of claim 2, the drive mechanism comprising:
    a motor for driving a motor shaft;
    a drive shaft;
    a mechanical coupler for joining the motor shaft to the drive shaft;
    a first gear on the drive shaft;
    a second gear on a gear shaft, the first gear in mechanical contact with the second gear;
    a first sprocket attached to the gear shaft;
    a second sprocket attached to the pivot shaft;
    a chain mounted on both the first sprocket and the second sprocket, whereby the torque from the gear shaft is transmitted to the pivot shaft;
    a motor controller card for producing a motor drive signal in response to the control signal from the printed circuit board; and
    a power supply for supplying power to the display retract mechanism.

7. The display retract mechanism of claim 6, further comprising: a clutch mechanism for selectively engaging and disengaging the drive mechanism.

8. The display retract mechanism of claim 6, further comprising: a latch for locking the frame into the retracted position.

9. The display retract mechanism of claim 6, wherein the gear ratio of the first gear to the second gear is about 200:1.

10. The display retract mechanism of claim 1, further comprising: a housing to which the pivot shaft is mounted, the housing adaptable for receiving the frame in the retracted position.

11. The display retract mechanism of claim 10, wherein the frame and the housing are fabricated from a material selected from the group consisting of polyetherimide or polyphenylsulfone.

12. The display retract mechanism of claim 10, wherein the housing is coated with a copper epoxy resin.

13. The display retract mechanism of claim 10, wherein the motor controller card, the power supply, and the printed circuit board are mounted to the housing.

14. A display retract mechanism for moving a display from a deployed position to a retracted position, comprising:
  a frame adapted for holding a display;
  a pivot shaft defining a pivot axis, the pivot shaft rotatable around the pivot axis from the retracted position to the deployed position;
  a lever arm fixed to the pivot shaft;
  a gas spring biased toward the retracted position, the gas spring hingedly connected to the lever arm;
  a drive mechanism for rotating the pivot shaft around the pivot axis from the retracted to the deployed position;
  a housing to which the pivot shaft is mounted, the housing adaptable for receiving the frame in the retracted position, and
  wherein the gas spring substantially freely moves the pivot shaft from the deployed position toward the retracted position when the drive mechanism releases the pivot shaft.

15. The display retract mechanism of claim 14, further comprising: a detector for determining when the frame is in the retracted position.

16. The display retract mechanism of claim 14, further comprising:
  a cross-hatched slip past cable that connects the display with a printed circuit board.

17. The display retract mechanism of claim 16, wherein the printed circuit board is connected to a power connector.

18. The display retract mechanism of claim 16, wherein the printed circuit board is connected to a video connector.

19. The display retract mechanism of claim 14, wherein the frame and the housing are fabricated from a material selected from the group consisting of polyetherimide or polyphenylsulfone.

20. The display retract mechanism of claim 14, wherein the housing is coated with a copper epoxy resin.

21. The display retract mechanism of claim 14, further comprising: a latch for locking the frame into the retracted position.

22. The display retract mechanism of claim 14, the drive mechanism comprising:
  a motor for driving a motor shaft;
  a drive shaft;
  a mechanical coupler for joining the motor shaft to the drive shaft;
  a first gear on the drive shaft;
  a second gear on a gear shaft, the first gear in mechanical contact with the second gear;
  a first sprocket attached to the gear shaft;
  a second sprocket attached to the pivot shaft;
  a chain mounted on both the first sprocket and the second sprocket, whereby the torque from the gear shaft is transmitted to the pivot shaft;
  a motor controller card for producing a motor drive signal in response to the control signal from a printed circuit board; and
  a power supply for supplying power to the display retract mechanism.

23. The display retract mechanism of claim 22, further comprising: a clutch mechanism for selectively engaging and disengaging the drive mechanism.

24. The display retract mechanism of claim 22, wherein the gear ratio of the first gear to the second gear is about 200:1.

25. The display retract mechanism of claim 22, wherein the motor controller card, the power supply, and the printed circuit board are mounted to the housing.

26. A display retract mechanism for moving a display from a deployed position to a retracted position, comprising:
  a frame for holding a display;
  a pivot shaft, the frame attached thereto along a pivot axis, the pivot shaft rotatable around the pivot axis from the retracted position to a deployed position;
  a lever arm attached to the pivot shaft;
  a gas spring biased toward the retracted position, the gas spring hingedly connected to the lever arm;
  detector means for detecting when the display is in the retracted position;
  drive means for supplying torque to the pivot shaft, in order to rotate the frame around the pivot axis from the retracted position to the deployed position, and
  wherein the gas spring freely moves the pivot shaft from the deployed position toward the retracted position when the drive means releases the pivot shaft.

27. The display retract mechanism of claim 26, wherein a cross-hatched slip past cable connects the display to a printed circuit board.

28. The display retract mechanism of claim 27, wherein the printed circuit board is connected to a power connector.

29. The display retract mechanism of claim 27, wherein the printed circuit board is connected to a video connector.

30. The display retract mechanism of claim 26, further comprising: a clutch mechanism for selectively engaging and disengaging the drive mechanism.

31. The display retract mechanism of claim 26, further comprising: a latch for locking the frame into the retracted position.

32. The display retract mechanism of claim 26, wherein the gear ratio of the first gear to the second gear is about 200:1.

33. The display retract mechanism of claim 26, further comprising: a housing to which the pivot shaft is mounted, the housing adaptable for receiving the frame in the retracted position.

34. The display retract mechanism of claim 33, wherein the frame and the housing are fabricated from a material selected from the group consisting of polyetherimide or polyphenylsulfone.

35. The display retract mechanism of claim 33, wherein the housing is coated with a copper epoxy resin.

36. The display retract mechanism of claim 33, wherein the motor controller card, the power supply, and a printed circuit board are mounted to the housing.

37. A method for moving a display from a deployed position to a retracted position, the method comprising the steps of:
  holding the display in a frame;
  rotating a pivot shaft around a pivot axis, the frame attached to the pivot shaft along the pivot axis;
  fixing a lever arm to the pivot shaft, the lever arm compressing a gas spring as the pivot shaft is rotated around the pivot axis from the retracted position to the deployed position;
  supplying torque to the pivot shaft for rotating the pivot shaft from the retracted to the deployed position with a drive mechanism, and allowing the gas spring to substantially freely move the pivot shaft from the deployed position to the retracted position when the drive mechanism releases the pivot shaft.

38. The method of claim 37, further comprising the steps of:
generating a detector signal;
receiving the detector signal in order to produce a status signal;
blocking the detector signal with a pin in order to prevent the receiving of the detector signal; and
processing the status signal in order to produce a control signal.

39. The method of claim 38, further comprising the step of: attaching the pivot shaft to a housing, the housing adapted for receiving the frame when the display is in the retracted position.

40. The method of claim 37, further comprising the step of:
using an electromechanical clutch to hold the display in place.

41. The display retract mechanism of claim 1, further comprising:
a clutch for selectively engaging and disengaging the drive mechanism.

42. The display retract mechanism of claim 41, further comprising:
a detector for determining when the frame is in the retracted position.

43. The display retract mechanism of claim 41, wherein a cross-hatched slip past cable connects the display to a printed circuit board.

44. The display retract mechanism of claim 43, wherein the printed circuit board is connected to a power connector.

45. The display retract mechanism of claim 43, wherein the printed circuit board is connected to a video connector.

46. The display retract mechanism of claim 41, wherein the clutch includes an electromechanical clutch.

47. The display retract mechanism of claim 41, the drive mechanism comprising:
a motor for driving a motor shaft;
a drive shaft;
a mechanical coupler for joining the motor shaft to the drive shaft;
a first gear on the drive shaft;
a second gear on a gear shaft, the first gear in mechanical contact with the second gear;
a first sprocket attached to the gear shaft;
a second sprocket attached to the pivot shaft;
a chain mounted on both the first sprocket and the second sprocket, whereby the torque from the gear shaft is transmitted to the pivot shaft;
a motor controller card for producing a motor drive signal in response to the control signal from the printed circuit board; and
a power supply for supplying power to the display retract mechanism.

48. The display retract mechanism of claim 47, further comprising:
a latch for locking the frame into the retracted position.

49. The display retract mechanism of claim 47, wherein the gear ratio of the first gear to the second gear is about 200:1.

50. A display retract mechanism as claimed in claim 46, wherein:
the gas spring substantially freely moves the pivot shaft from the deployed position to the retracted position when the clutch disengages the drive mechanism.

* * * * *